United States Patent
Beeteson et al.

(10) Patent No.: US 6,268,705 B1
(45) Date of Patent: Jul. 31, 2001

(54) RASTER DEMODULATION APPARATUS AND METHOD

(75) Inventors: John Beeteson, Skelmorlie; Andrew Knox, Kilbirnie, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/836,797

(22) PCT Filed: Aug. 15, 1995

(86) PCT No.: PCT/GB95/01927
§ 371 Date: May 19, 1997
§ 102(e) Date: May 19, 1997

(87) PCT Pub. No.: WO96/23316
PCT Pub. Date: Aug. 1, 1996

(30) Foreign Application Priority Data

Jan. 24, 1995 (GB) .................................................. 9501277
Feb. 3, 1995 (GB) .................................................. 9502108

(51) Int. Cl.[7] ..................................................... G09G 1/28
(52) U.S. Cl. ................... 315/368.27; 315/368.28
(58) Field of Search ...................... 315/368.28, 368.25, 315/379, 5.35, 370, 371, 368.27; 313/413, 414, 431, 433, 440; 335/306, 299, 210, 212, 213

(56) References Cited

U.S. PATENT DOCUMENTS

| | | | |
|---|---|---|---|
| 4,970,429 | 11/1990 | Franken | 313/384 |
| 5,028,850 | 7/1991 | Grote et al. | 315/371 |
| 5,079,486 | * | 1/1992 | Honda et al. | 315/371 |
| 5,301,021 | * | 4/1994 | Ogino et al. | 348/564 |
| 6,023,191 | * | 2/2000 | Connell et al. | 327/554 |

FOREIGN PATENT DOCUMENTS

| | | |
|---|---|---|
| 193983 | 9/1986 | (EP) . |
| 235856 | 9/1987 | (EP) . |
| 456224 | 11/1991 | (EP) . |
| 562200 | 9/1993 | (EP) . |
| 1027645 | 4/1966 | (GB) . |
| 2085698 | 4/1982 | (GB) . |

OTHER PUBLICATIONS

N. H. Dekkers, A universal deflection unit generating a field of any order and azimuth, Journal Phys. D: Appl. Phys. 7:805–814 (1974).*

* cited by examiner

*Primary Examiner*—Seungsook Ham
*Assistant Examiner*—Shun Lee
(74) *Attorney, Agent, or Firm*—Scully, Scott, Murphy & Presser; Daniel P. Morris, Esq.

(57) ABSTRACT

Raster demodulation apparatus for a raster-scanned cathode ray tube display comprises control means (400) for varying the shape of at least one scanned electron beam spot (661–663) in a direction perpendicular to scan lines of the raster. The control means (400) comprises an electro-magnet (700) for mounting on the neck of the cathode ray tube. The magnet (700) has eight pole pieces (720–790) spaced around the neck of the cathode ray tube (210). A winding (710) passes around each of the pole pieces (720–790) in succession in opposite directions so that, when an electrical current (I) is passed through the winding, adjacent pole pieces (720–790) around the neck of the cathode ray tube have different magnetic polarity to generate, within the neck of the cathode ray tube (210), a magnetic field in which magnetic lines of force (680) pass through the or each electron beam (661–663) only in a direction parallel to the scan lines of the raster.

12 Claims, 9 Drawing Sheets

FIG. 2a

FIG. 2b mag mag mag

RASTER DEMODULATION APPARATUS AND METHOD

BACKGROUND OF THE INVENTION

1. Technological Field

The present invention relates to a method and apparatus for reducing vertical raster modulation in a raster scanned cathode ray tube (CRT) display.

2. Prior Art

Electron gun technology in high resolution CRT displays give very small electron beam spots on the CRT screen to provide good resolution in high addressability video formats. An increase in desired addressability stems from the increasing popularity of graphical user interfaces such as the Windows operating system from Microsoft and the OS/2 operating system from IBM. However, displays are also frequently used in more conventional text modes such as the Disk Operating System (DOS) text mode. These older text modes have lower addressabilities, leading to vertical break up of characters when a display with a small electron beam spot size is used. The character break up is generally known as vertical raster modulation. Displays having aperture grille CRTs are particularly susceptible to vertical raster modulation.

Conventionally, vertical raster modulation has been avoided by "doubling" the pixels in both the horizontal and vertical directions of the raster, thereby doubling the line density of the displayed image. However, many computer graphics adaptors do not have pixel doubling capability. Consequently, when they drive a high resolution display, vertical raster modulation can be come noticeable.

Vertical raster modulation in CRT displays having a single electron beam, such as for example, monochrome CRT displays or colour displays having a "Trinitron" CRT or similar CRT (Trinitron is a trade mark of Sony Corporation), the above mentioned problem of vertical raster modulation has been solved by stretching the electron beam spot in a vertical direction. This practice is generally referred in the art as applying an astigmatism to the spot. Conventionally, the astigmatism is applied by adding a four pole radially spaced electro-magnet structure to the electron gun assembly of the CRT. The four poles are equally spaced around the circumference of the neck of the CRT to generate a magnetic field which compresses the electron beam in a first direction and stretches it in a second direction orthogonal to the first direction, depending on the direction of current flow through the electro-magnet. Because the magnetic field generated by the four pole magnet structure acts in two orthogonal directions, this arrangement is not suitable for application to conventional in-line electron gun colour CRTs. Specifically, if used with such CRTs, this arrangement would cause convergence errors in the horizontal direction.

SUMMARY OF THE INVENTION

In accordance with the present invention, there is now provided raster demodulation apparatus for a raster-scanned cathode ray tube display, the apparatus comprising control means for varying the shape of at least one scanned electron beam spot in a direction perpendicular to scan lines of the raster; characterised in that the control means comprises an electro-magnet for mounting on the neck of the cathode ray tube, the magnet having eight pole pieces spaced around the neck of the cathode ray tube and a winding passing around each of the pole pieces in succession in opposite directions so that, when an electrical current is passed through the winding, adjacent pole pieces around the neck of the cathode ray tube have different magnetic polarity to generate, within the neck of the cathode ray tube, a magnetic field in which magnetic lines of force pass through the or each electron beam only in a direction parallel to the scan lines of the raster.

The present invention advantageously enables a vertical astigmatism to be selectively introduced in both single electron beam CRTs and in-line multiple electron beam CRTs without introducing unwanted electron beam distortions, such as convergence errors.

Preferably, the pole pieces are divided into first group of four pole pieces comprising two pairs of pole pieces facing each other in a direction parallel to the lines of the raster and a second group of four pole pieces comprising two pairs of pole pieces facing each other in a direction perpendicular to the lines of the raster, the first group each having a greater number of turns of the winding than the second group. This advantageously draws any lines of magnetic force perpendicular to the raster lines away from the region of the CRT neck occupied by the or each electron beam. In a preferred embodiment of the present invention, the poles in the first group each carry three times the number of turns of the winding carried by each of the poles of the second group. The pole pieces are preferably directed radially inwardly.

In a particularly preferred embodiment of the present invention, the control means is arranged to vary the current passing through the winding in dependence on the raster line density of an image displayed on the display.

This advantageously enables raster modulation to be reduced to below a noticeable level without impairing overall image quality.

The control means preferably comprises a detector for determining the raster line density in dependence on raster line and frame synchronisation signals corresponding to the image displayed on the display. The detector enables the demodulator to vary the shape of the electron beam spot in real time.

The detector may comprise a switched capacitor low pass filter having a clock input triggered by the line synchronisation signal, a signal input responsive to the frame synchronisation signal, and an output for varying the shape of the scanned electron beam. This is especially attractive because it is relatively inexpensive to implement, involving only a few relatively low cost electrical components. For optimum performance, the switched capacitor filter is preferably configured as a second order low pass filter.

Preferably, the detector comprises: first duty cycle means for converting the line synchronisation signal to a line square wave signals; and second duty cycle means for converting the frame synchronisation signal to a frame square wave signal. This effectively reduces harmonic content of the line and frame sync signals, optimising the operation of the switched capacitor filter.

In preferred embodiments of the present invention, the detector comprises an anti-aliasing filter having an input connected to the output of the second duty cycle means and an output connected to the signal input of the switched capacitor filter. This prevents aliasing in the switched capacitor filter.

The detector may comprise a divide by N counter having an input connected to the first duty cycle means and an output connected to the clock input of the switched capacitor filter. The divisor of the counter may be varied under the control of a microprocessor to adjust the response of the filter.

Preferably, the detector comprises a rectifier for generating a DC control level in response to the output of the filter.

It will be appreciated that the present invention extends to a cathode ray tube display comprising a cathode ray tube and raster demodulation apparatus as described above.

Viewing the present invention from another aspect, there is now provided a method for reducing raster modulation in a raster-scanned cathode ray tube display, the method comprising varying the shape of an scanned electron beam spot scanned by the display in dependence on the raster line density of an image displayed on the display.

BRIEF DESCRIPTION OF THE DRAWINGS

Preferred embodiments of the present invention will now be described, by way of example only, with reference to the accompanying drawings in which:

FIGS. 2a and 2b respectively show unbroken characters and characters affected by vertical raster modulation;

DETAILED DESCRIPTION OF THE PREFERRED EMBODIMENTS OF THE INVENTION

Figure 1:
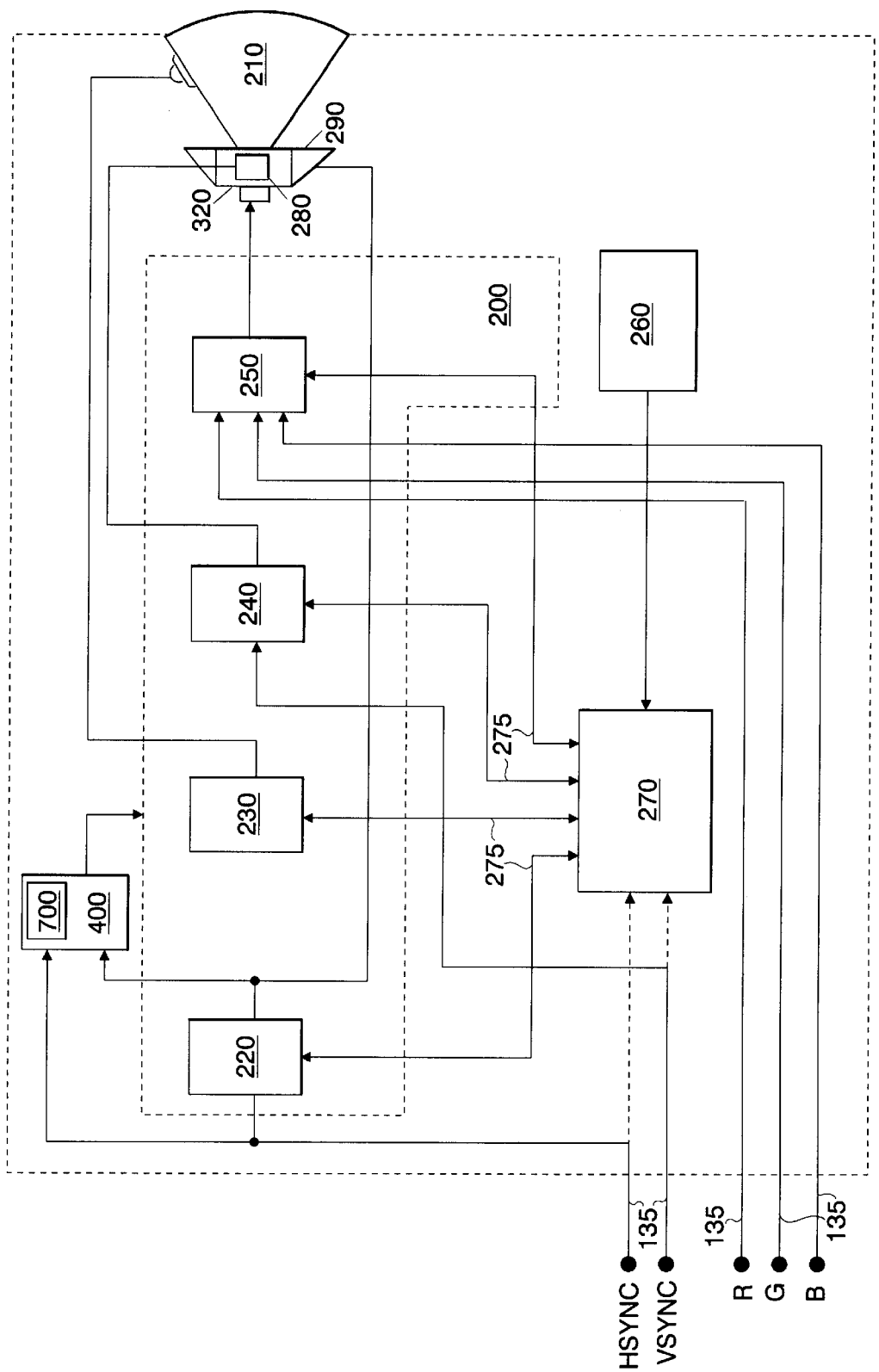
FIG. 1 is a block diagram of an example of a CRT display having a vertical raster demodulator.
Figure 3A:
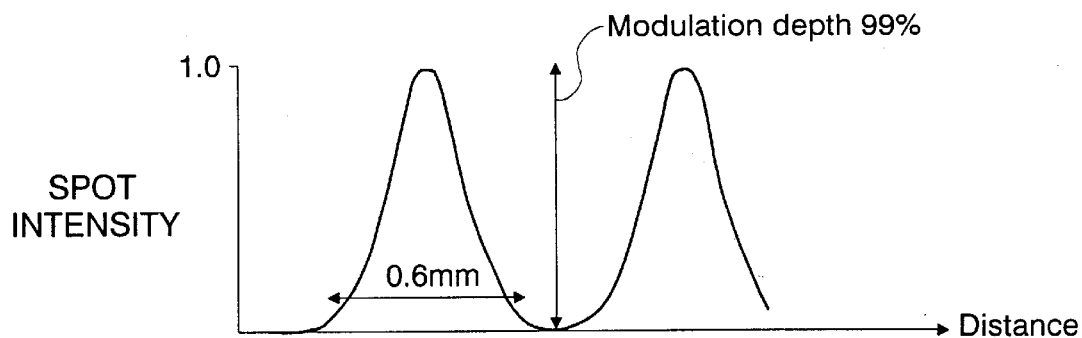
FIGS. 3a to 3d are waveform diagrams showing typical electron beam spot profiles.
Figure 3B:
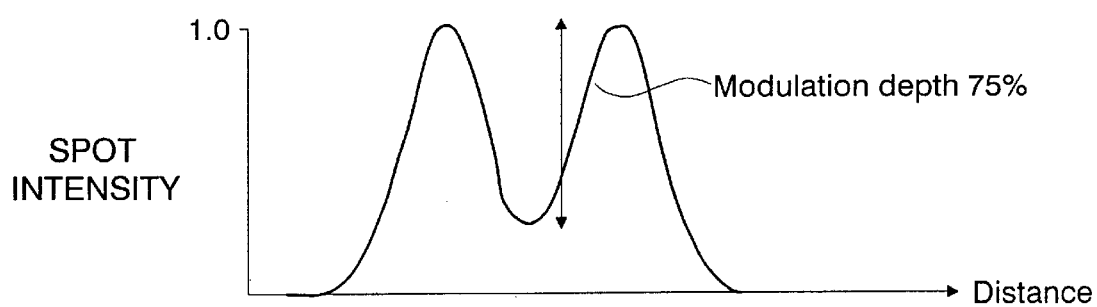
Figure 3C:
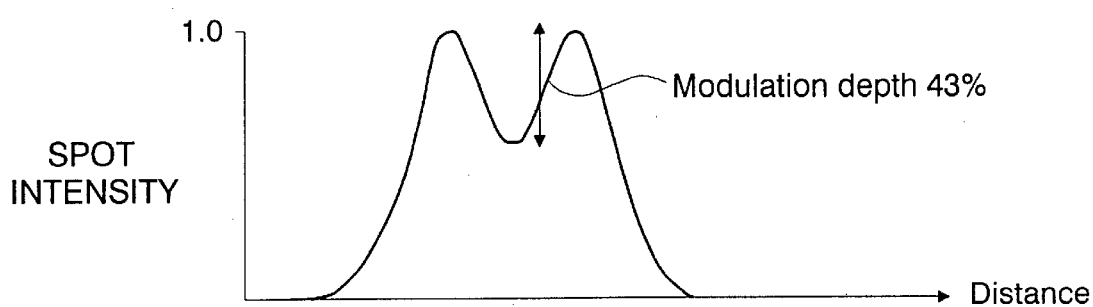
Figure 3D:
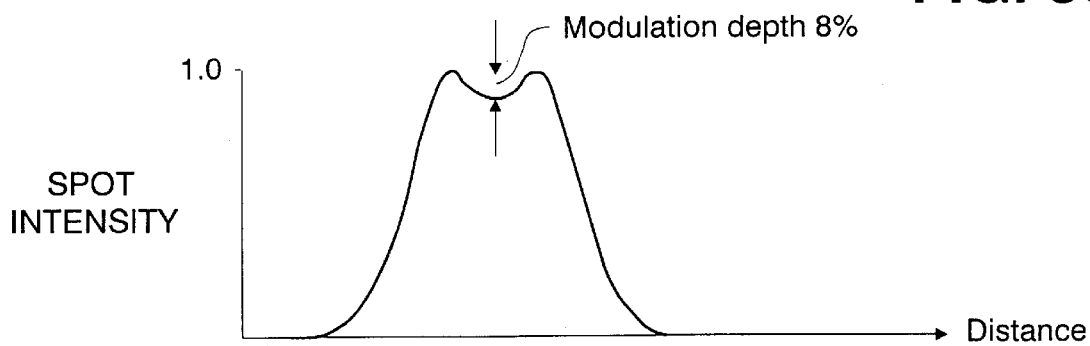

Referring first a FIG. 1, a CRT display comprises a colour cathode ray display tube (CRT) display screen 210 having an aperture grille. However, it will be appreciated from the following that the present invention is applicable to displays having aperture grille CRTs, to displays having shadow mask CRTs, and to displays having monochrome CRTs. CRT 210 is connected to display drive circuitry 200. Display drive circuitry 200 comprises an Extra High Tension (EHT) generator 230 and a video amplifier 250 connected to display screen 210. Line and frame deflection coils 290 and 280 are disposed around the neck of the CRT on a yoke 320. Deflection coils 290 and 280 are connected to line and frame scan circuits 220 and 240 respectively. Line scan circuit 220 and EHT generator 230 may each be in the form of a flyback circuit, the operation of which is well known by those skilled in the art. Furthermore, as is also well-known in the art, EHT generator 230 and line scan circuit 220 may be integrated in a single flyback circuit. A power supply (not shown) is connected via power supply rails (not shown) to EHT generator 230, video amplifier 250, and line and frame scan circuits 220 and 240. In use, the power supply provides electrical power on the supply rails from Line and Neutral connections (not shown) to the domestic electricity mains supply. The power supply may be in the form of a switch mode power supply, the operation of which is well-understood by those skilled in the art.

EHT generator 230, video amplifier 250, and line and frame scan circuits 220 and 240 are each connected to a display processor 270. Display processor 270 includes a microprocessor. A user control panel 260 is provided on the front of the display device. Control panel 260 includes a plurality of manual operable switches. User control panel is connected to key-pad interrupt lines of processor 270.

In operation, EHT generator 230 generates an electric field within CRT 210 for accelerating electrons in beams corresponding to the primary colours of red, green and blue towards the screen of CRT. Line and frame scan circuits 220 and 240 generate line and frame scan currents in deflection coils 290 and 280. The line and frame scan currents are in the form of ramp signals to produce time-varying magnetic fields that scan the electron beams across the screen of CRT 210 in a raster pattern. The line and frame scan signals are synchronised by line and frame scan circuits to input line and frame synchronisation (sync) signals HSYNC and VSYNC generated by a video source such as a personal computer system unit, for example. Video amplifier 250 modulates the red, green and blue electron beams to produce an output display on CRT 210 as a function of corresponding red, green and blue input video signals R, G and B also generated by the video source.

Display processor 270 is configured to control the outputs of EHT generator 230, video amplifier 250, and line and frame scan circuits 220 and 240 via control links 275 as functions of preprogrammed display mode data and inputs from user control 260. The display mode data includes sets of preset image parameter values each corresponding to a different popular display mode such as, for example, 1024× 768 pixels, 640×480 pixels, or 1280×1024 pixels. Each set of image display parameter values includes height and centring values for setting the output of frame scan circuit 240; and width and centring values for controlling line scan circuit 220. In addition, the display mode data includes common preset image parameter values for controlling the gain and cut-off of each of the red, green and blue channels of video amplifier 250; and present control values for controlling the outputs of EHT generator 230. The image parameter values are selected by display processor 270 in response to mode information form the video source. Display processor 270 processes the selected image parameter values to generate analog control levels on the control links.

A user can manually adjust, via user control 260, control levels sent from display processor 270 to drive circuitry 250 to adjust the geometry of the displayed picture according to personal preference. User control panel 260 includes a set of up/down control keys for each of image height, centring, width, brightness and contrast. Each of the keys controls, via display processor 270, a different one or combination of the control levels, such as those controlling red green and blue video gains and cutoffs at video amplifier 250; and those controlling image width, height, and centring at line and frame scan circuits 220 and 240.

The control keys are preferably in the form of push-buttons connected to key-pad interrupt inputs to display processor 270. When, for example, the width up key is depressed, user control panel 260 issues a corresponding interrupt to display processor 270. The source of the interrupt is determined by display processor 270 via an interrupt polling routine. In response to the interrupt from the width key, display processor 270 progressively increases the corresponding analog control level sent to line scan circuit 220. The width of the image progressively increases. When the desired width is reached, the user releases the key. The removal of the interrupt is detected by display processor 270, and the digital value setting the width control level is retained. The height, centring, brightness and contrast setting can be adjusted by the user in similar fashion. User control panel 260 preferably further includes a store key. When the user depresses the store key, an interrupt is produced to which display processor 270 responds by storing in memory parameter values corresponding the current settings of the digital outputs to D to A convertor as a preferred display format. The user can thus programme into display specific display image parameters according to personal preference. It will be appreciated that, in other embodiments of the present invention, user control panel 260 may be provided in the form of an on-screen menu.

In accordance with the present invention, the display comprises a vertical raster demodulator 400 connected to drive circuitry 200.

Figures 2A, 2B:
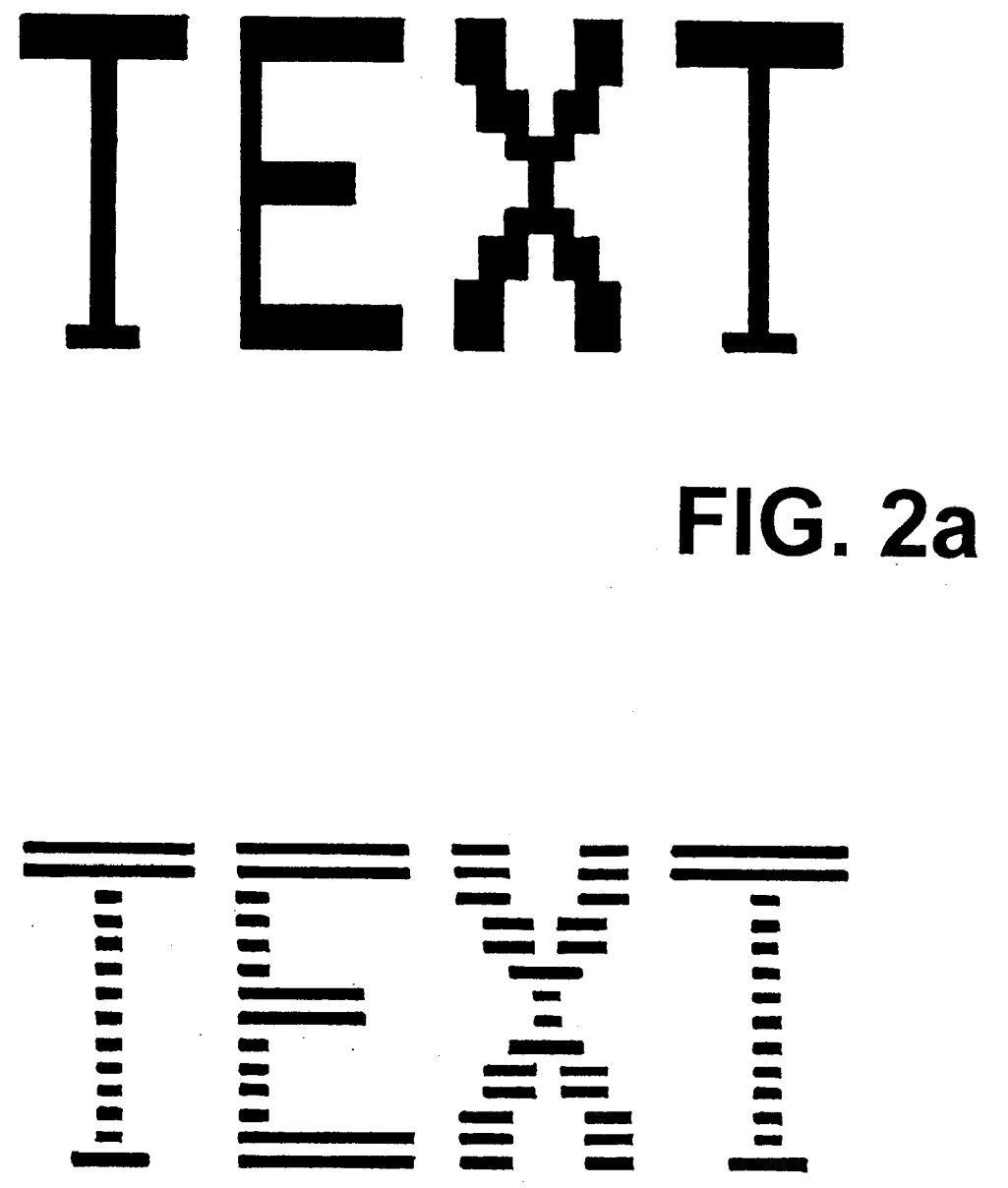

FIG. 2a shows a string of characters unaffected by vertical raster modulation. Referring now to FIG. 2b, vertical raster modulation has the effect of breaking the characters up in the vertical direction.

FIGS. 3a to d show typical electron beam spot profiles for 400 line, 600 line, 768 line and 1024 line rasters respectively. The electron beam spot diameter in each case is measured, as is usual, at the 5 percent luminance level. For a 21 inch CRT, the diameter is typically 0.6 mm. The image height on the 21 inch CRT in each case is of the order of 300 mm. It will be appreciated from the profiles that modulation depth decreases as vertical line density increases. The actual profile of each spot is Gaussian. The profiles in FIGS. 3a to d demonstrate summation of spot profiles on overlapping scan lines. The modulation depths apparent from the profiles of FIGS. 3a to d are well within the limits of detection by the human eye. However, this does not take into account the spatial cut-off frequency of the eye. At high line densities, very close inspection of the displayed image will reveal the modulation. However, at typical viewing distances, the effect is attenuated to such an extent that the image appears "smooth".

In operation, demodulator 400 reduces vertical raster modulation to below a noticeable level without impairing image quality by selectively applying a vertical astigmatism to the electron beam spot in dependence on the raster line density. The line density can be defined by the ratio of the frequencies of the line sync and frame sync signals HSYNC and VSYNC.

If the electron beam spot is made vertically astigmatic, or "stretched" in the vertical direction, the excited phosphor area per scan line increases. Visual inspection of 768 line video format has indicated that performance is then generally acceptable. In a 600 line video format on a high resolution display, some modulation may be visible. In a 480 line video format, modulation tends to be plainly visible. In a 400 line format, modulation is generally unacceptably high.

In a preferred embodiment of the present invention, demodulator 400 comprises a spot shape control system including a dynamic astigmatism control in the electron gun assembly of CRT 210. Spot astigmatism is controlled by the dynamic astigmatism control via focus modulation. In another preferred embodiment of the present invention, demodulator 400 comprises a spot shape control system including a magnetic circuit external to CRT 210 but mounted adjacent the electron gun assembly for varying the shape of the cross section of the electron beams produced by the electron gun assembly.

Figure 4:
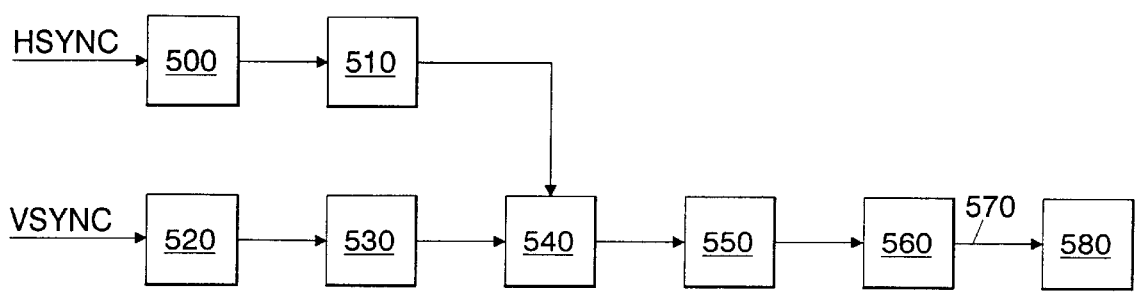
FIG. 4 is a block diagram of an example of a vertical line density detector of the demodulator.

Referring now to FIG. 4, an example of a line density detector of demodulator 400 comprises a divide by two flip flop 500 having an input connected to the line sync signal HSYNC. The output of flip flop 500 is connected to the input of a divide by four counter 510. Another divide by two flip flop 520 has an input connected to the frame sync signal VSYNC. The output of flip flop 520 is connected to the input of a low pass filter 530. The output of filter 530 is connected to the input of a switched capacitor filter 540. Filter 540 has a clock input connected to the output of counter 510. The output of filter 540 is connected to the input of an active rectifier circuit 550. The output of rectifier circuit 550 is connected to an invertor 560.

In operation, flip flops 500 and 520 each provide a 50 percent duty cycle output regardless of the pulse width of their respective input sync signals. The 50 percent duty cycle permits more accurate operation of filter 540. The harmonic content of a low duty cycle pulse signal is much higher than that of a square wave. Flip flops 500 and 520 effectively reduce the harmonic content of the HSYNC and VSYNC signals input to demodulator 400. Counter 510 reduces the frequency of the output of flip flop 500 to a frequency appropriate for clocking filter 540. Filter 530 has −3 dB point set to 100 Hz. This provides anti-aliasing for filter 540. Filter 540 is configured as a second order Butterworth low pass filter with unity pass band gain. The clock to break frequency ratio is 200:1. Rectifier 550 converts the output of filter 540 to a DC voltage. The input to invertor 560 is a constant "high" when the frequencies of sync signals HSYNC and VSYNC are such that there is no raster modulation. As the sync ratio falls and the cut-off region of filter 540 is entered, the voltage will fall, indicating that astigmatism control is required. Invertor 560 reverses the sense of the control voltage at 570 to the spot astigmatism control system of demodulator 400. Thus detector output 570 is "low" when inactive and rises according to the degree of spot control required. Invertor 560 may be implemented, for example by a subtracter and a reference voltage. It will be appreciated that in some embodiments of the present invention, invertor 560 may be omitted.

In operation, switched capacitor filter 540 samples the incoming output from filter 530 at the frequency of the output from counter 510. This frequency will hereinafter be referred to as the clock frequency. In the general case, the corner frequency of a switched capacitor filter is a submultiple of the clock frequency. In the case of filter 540, the sub-multiple is a factor of 200. The conditions for vertical raster modulation can be detected by comparing the ratios of the line and frame sync signals HSYNC and VSYNC. Filter 540, because of the external clocking, can perform this ratioing without reference to absolute frequency. Filter 540 operates only on the basis of relative frequencies.

However, filter 540 is effectively a sampled data system. To prevent anti-aliasing components above the Nyquist limit, filter 530 is required. Filter 530 may be implemented in the form of a simple RC first order low pass filter. As mentioned earlier, the −3 dB point of filter 530 is set at 100 Hz. Thus, with a sampling frequency of 15.75 kHz (corresponding to the lowest VGA line rate, for example), any input frequency components at this sampling rate will be attenuated by 20 $\log_{10}$ (15,750/100)=44 dB. The choice of 100 Hz break frequency for filter 530 corresponds to a frame rate of 200 Hz, higher than practical frame frequencies. It will be appreciated that, in other embodiments of the present invention, a higher break point frequency for filter 530 may be selected in event that frame frequencies increase above 200 Hz.

As mentioned earlier, flip flop 520 generates a 50 percent duty cycle output signal from input frame sync signal VSYNC. The frame sync signal is of extremely low (or high depending on the polarity of frame signal VSYNC) duty cycle. The frequency spectrum of a narrow pulse has significantly higher harmonic content than that of a square wave. Thus, flip flop 520 limits the harmonic content of the input to filter 540. For a typical 480 line video format with a frame rate of 60 Hz and line rate of 31.5 kHz, the harmonic content at the sampling rate of 15.75 kHz is 60/31500 of the fundamental amplitude. This corresponds approximately to 54 dB. When passed through filter 530 with another −44 dB of gain at this frequency, the total harmonic attenuation is 98 dB. This is below the typical noise floor of filter 540. In particularly preferred embodiments of the present invention, flip flop 520 is a CMOS device having a symmetrical current sink/source output stage for driving filter 530.

As mentioned earlier, for optimum operation of filter 540, it is preferable for the clock to have a 50 percent duty cycle. However, line sync signal HSYNC has the similar format-dependent width variations to those of frame sync signal VSYNC. This problem is solved by flip flop 500.

Following from the theoretical analysis earlier, a line to frame ratio of approximately 800 for a 21 inch high resolution display will give a generally satisfactory raster modulation ratio. Below this, separate scan lines will start to become visible. Filter 540 effectively performs a divide by 200 operation which leaves a division by 4 outstanding. Remember that both sync signals HSYNC and VSYNC have been divided by two. Thus there is no ratio change. The divide by four operation is performed by counter 510. Counter 510 may conveniently be implemented by a cascaded pair of flip flops. In other embodiments of the present invention, a division ratio other than 800 may be required. This may be implemented by a phased locked frequency multiplier followed by a counter to perform the required division with the clock provided to filter 540 preferably having a 50 percent duty cycle. It will be appreciated that the precise division required depends on the CRT image height and spot size. It will also be appreciated that filter 540 may have a clock to break frequency ratio other than 200, in which case it is preferable to transpose counter 510 and flip flop 500 in the signal path of line sync signal HSYNC.

The frequency multiplier and divider for filter clock generation or a variable clock to break frequency ratio permits other control options to be introduced. For example, processor 270 of the display can be configured to adjust the multiplication factor of the multiplier and the divisor of the divider according the image height set by the user control panel 260. Alternatively, a separate raster modulation control may be provided in control panel 260, with processor 270 transferring changes in data to the multipliers and divider. In both examples, the effect of count ratio modification is to vary the break frequency of filter 540, thereby providing greater or lesser spot control for a given video format.

As mentioned earlier, filter 540 is configured as a second order low pass filter. However, it will be appreciated that, in other embodiments of the present invention, filter 540 may be configured as a different order filter. The input to filter 540 is a band-limited square wave at approximately TTL levels. For illustration, it will hereinafter be assumed that the filter input amplitude is 4V peak to peak.

Suppose signals corresponding to a 720×400 pixel video format with a line rate of 31.5 kHz and a frame rate of 70 Hz are applied to the detector. The clock frequency supplied to filter 540 is 3937.5 Hz. The −3 dB point $F_c$ of filter 540 is thus 19.69 Hz. The input to filter 540 has a frequency of 35 Hz and an amplitude of 4V. The attenuation provided by filter 540 is thus 40 $\log_{10}$(35/19.69)=10 dB. The output signal amplitude from filter 540 is therefore 1.27V peak to peak. This voltage is rectified by rectifier 550 to provide an output DC level of 1.27V.

Suppose now that signals corresponding to a 1280×1024 pixel format with a line rate of 81.78 kHz and a frame rate of 77.1 Hz are applied to the detector. The clock frequency supplied to filter 540 is 10222.5 Hz. The 3 dB point of filter 540 is thus 51.1 Hz. The input to filter 540 has a frequency of 38.55 Hz and an amplitude of 4V. The input to filter 540 is thus well within the pass band. The attenuation provided by filter 540 is thus 0 dB. The output signal amplitude from filter 540 is therefore 4V peak to peak. This voltage is rectified by rectifier 550 to provide an output DC level of 4V.

Table 1 below provides, by way of example only, data for common video formats between the above examples. It will be appreciated from Table 1 that as the ratio drops below that at which raster modulation become visible, the output from the detector starts to drop proportionally. Above this ratio, the detector has no effect and the spot control system is therefore inactive leaving the image unaltered.

TABLE 1

| FORMAT | LINE RATE | FRAME RATE | F | ATTENUATION | OUTPUT |
| --- | --- | --- | --- | --- | --- |
| 720 × 400 | 31500 Hz | 70 Hz | 19.69 Hz | 10 dB | 1.27 V |
| 640 × 480 | 31500 Hz | 60 Hz | 19.69 Hz | 7.3 dB | 1.73 V |
| 640 × 480 | 39400 Hz | 75 Hz | 24.63 Hz | 7.3 dB | 1.73 V |
| 800 × 600 | 48000 Hz | 72 Hz | 30.00 Hz | 3.2 dB | 2.77 V |
| 1024 × 768 | 61100 Hz | 75.8 Hz | 38.19 Hz | 0.1 dB | 3.95 V |
| 1280 × 1024 | 81780 Hz | 77.1 Hz | 51.1 Hz | 0 dB | 4.00 V |

Comparing lines 1 and 2 of Table 1 shows that with a constant line rate but decreasing frame rate (and hence increasing line density), the degree of spot compensation reduces. Comparing lines 2 and 3 of Table 1, where both line rate and frame rate increase but the format remains at 640×480, the degree of spot compensation is unchanged, consistent with the line density remaining unchanged. Line 5 corresponds to the format at which demodulator 400 ceases spot modification. Note that the attenuation factor is insignificant in line 5. Line 6 corresponds to a video format above the visible raster modulation limit. The frame rate is well below the corner frequency of filter 540. There is no attenuation and thus no spot modulation.

Figure 5:
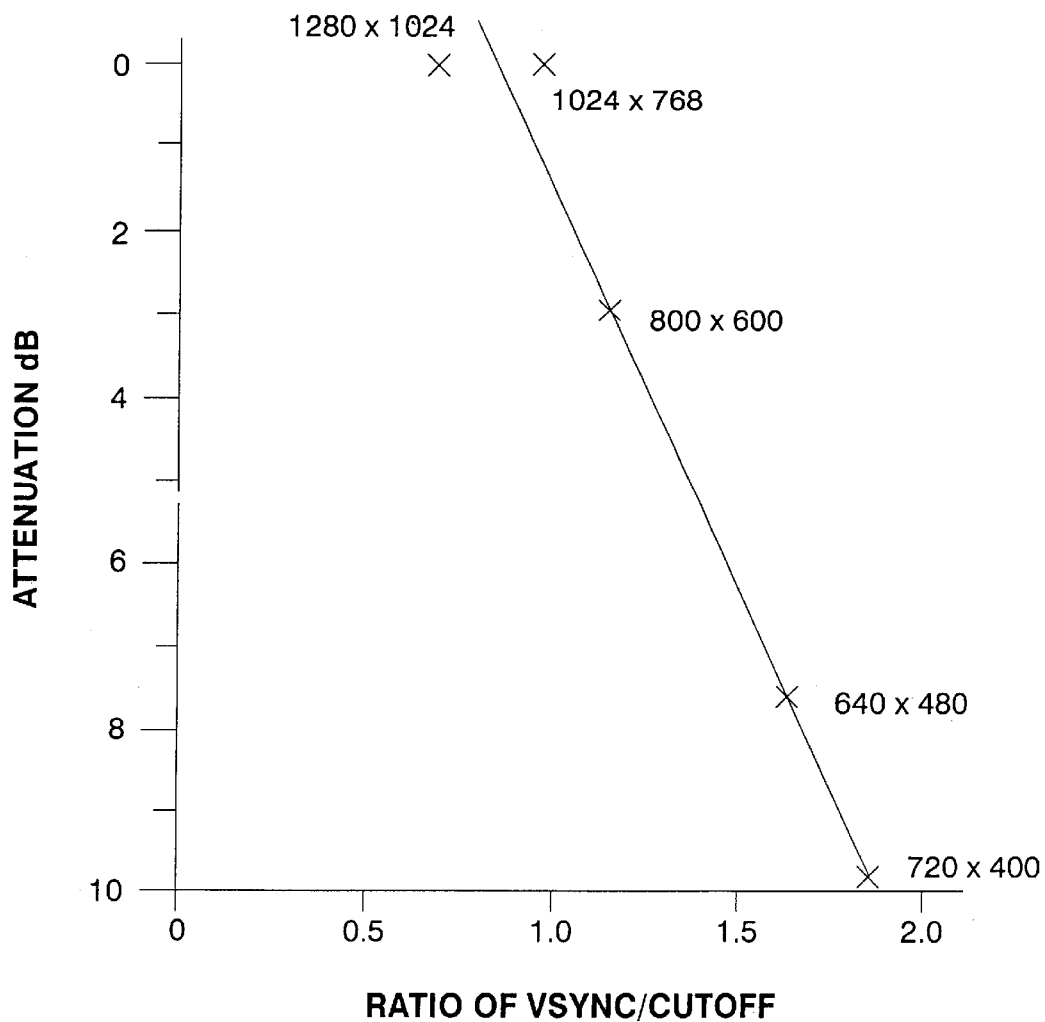
FIG. 5 is a graph of vertical synchronisation signal attenuation in relation to the ratio of vertical sync to filter cut-off frequency corresponding to the detector.

Referring now to FIG. 5, depicted therein is a graph of frame sync signal attenuation in relation to the ratio of frame sync to cut-off frequency. The data plotted has been normalised so that the break frequency line at a ratio of 1:1. The various video formats in Table 1 are marked. The graph is, as to be expected, indicative of a low pass frequency response.

Figure 6:
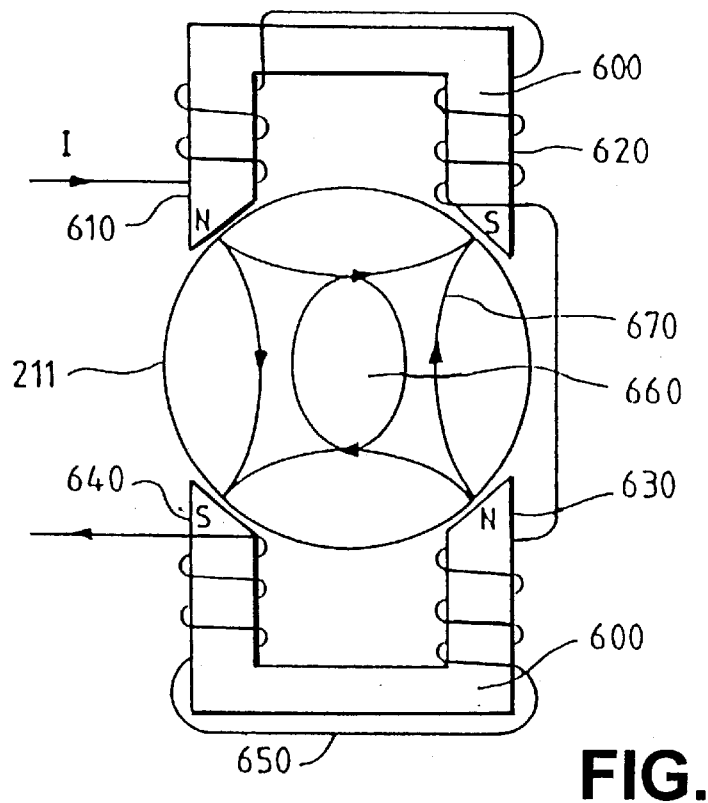
FIG. 6 is a cross-sectional view of a single beam CRT with a conventional astigmatism control system.

Referring now FIG. 6, in a preferred embodiment of the present invention, CRT 210 is single electron beam colour CRT such as for example, a Trinitron CRT. Spot astigmatism control system 580 of demodulator 400 comprises a four pole radial electro-magnet structure 600 formed from ferromagnetic material mounted around the neck 211 of CRT 210 adjacent the electron gun assembly producing electron beam 660. Poles 610–640 of structure 600 are substantially equally spaced around the circumference of neck 211. A winding is wound onto each pole 610–640 of structure 600. The winding 650 passes around each pole in turn in alternate directions to provide, in operation, successive poles around neck 211 with opposite polarities N and S. In use, structure 600 is energised by a current I flowing in winding 650. Current I is generated by control voltage 570. When energised, structure 600 generates a magnetic field in neck 211. The lines of force in the magnetic field are shown at 670. The direction of force indicated by the arrows is determined by the direction of current flow through winding 650. Lines of force 670 pass through electron spot 660 one way and then the other in one direction, horizontally. This has stretches electron beam 660 in the vertical direction, making it vertically astigmatic.

Figure 7:
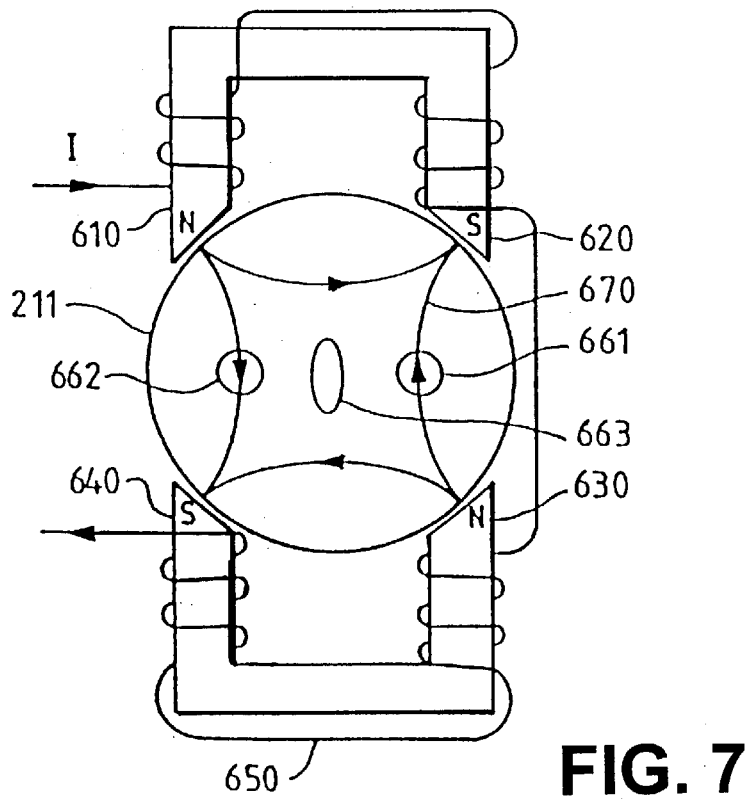
FIG. 7 is a cross-sectional view of an in-line beam CRT with a conventional astigmatism control system.

In the preferred embodiment of the present invention described in the preceding paragraph, CRT 210 has only one electron beam 660. However, referring now to FIG. 7, in other displays, CRT 210 is an in-line electron beam having three electron beams 661 to 663 arranged in a row, each electron beam corresponding to a different one of video signals R, G and B. It will be appreciated from FIG. 7 that, if four pole structure 600 is mounted on the in-line beam CRT, then, in operation, only centre electron beam 663 would be exposed to magnetic force lines in the horizontal direction. Outer electron beams 661 and 662 would be exposed to magnetic force lines in the vertical direction. Thus outer electron beams 661 and 662 would be deflected horizontally, producing a convergence error on the screen of CRT 210.

Figure 8:
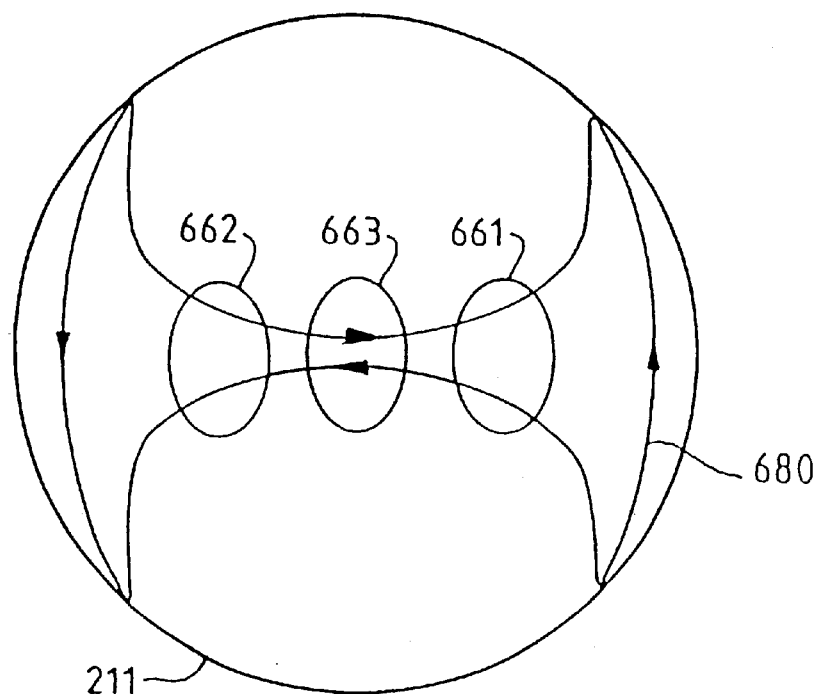
FIG. 8 is a cross sectional view of force lines corresponding to a magnetic field for generating vertical astigmatism in in-line electron beams.
Figure 9:
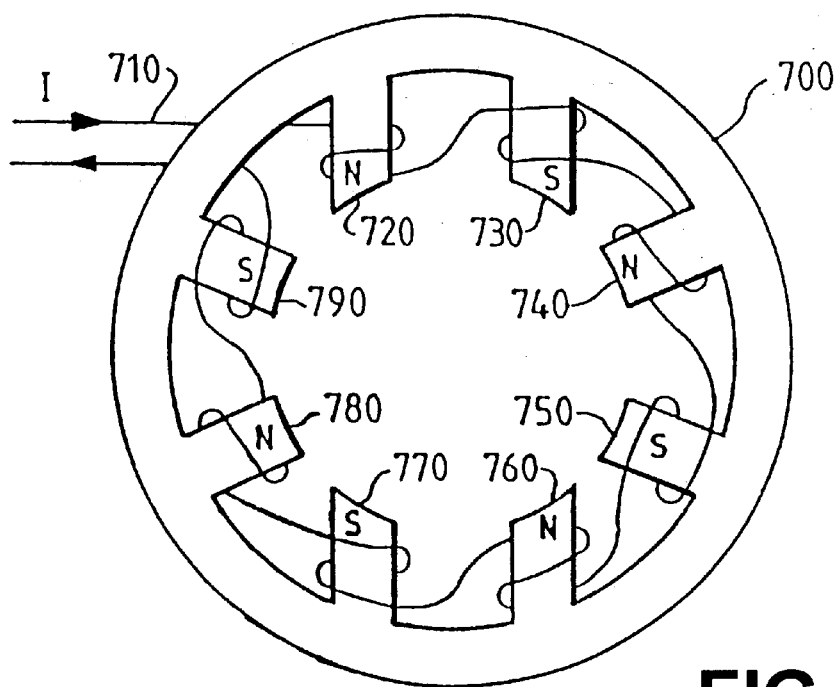
FIG. 9 is a plan view of an eight pole electro-magnet structure.
Figure 10:
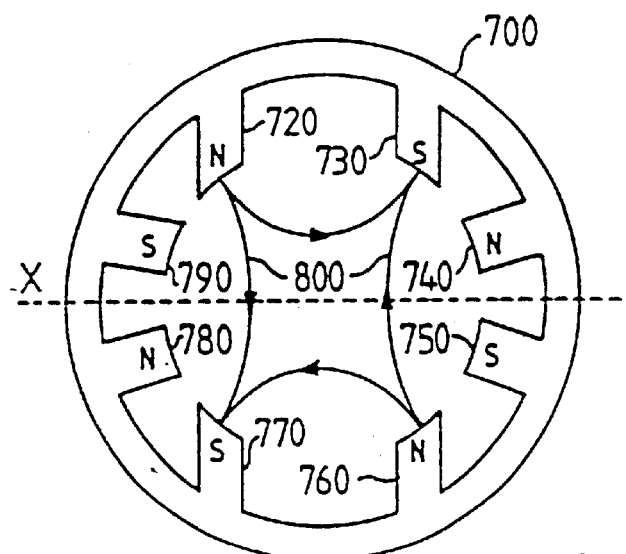
FIG. 10 a plan view of the structure of FIG. 9 and the force lines corresponding to the magnetic field generated by four of the poles.
Figure 11:
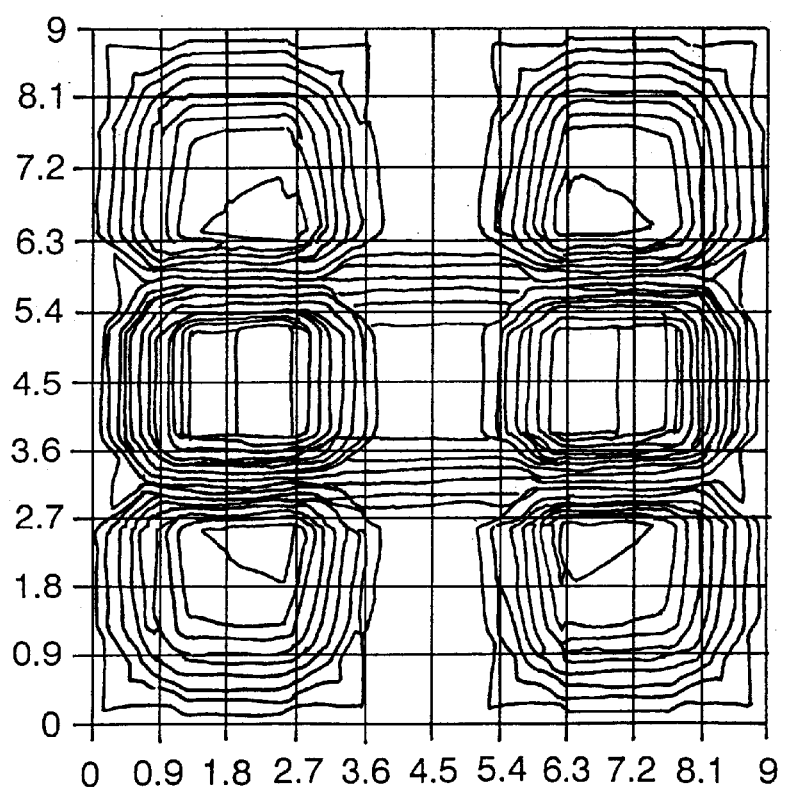
FIG. 11 is a chart showing the magnetic field distribution for the arrangement of FIG. 10.
Figure 12:
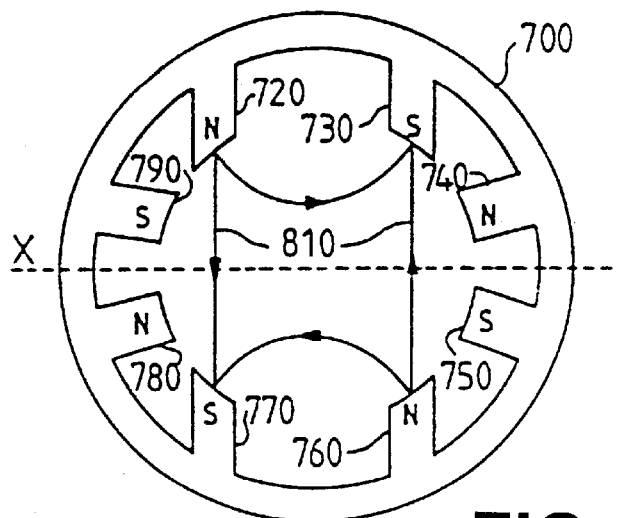
FIG. 12 is a plan view of the structure of FIG. 9 and the force lines corresponding to a magnetic field generated by all eight poles when equally energised.
Figure 13:
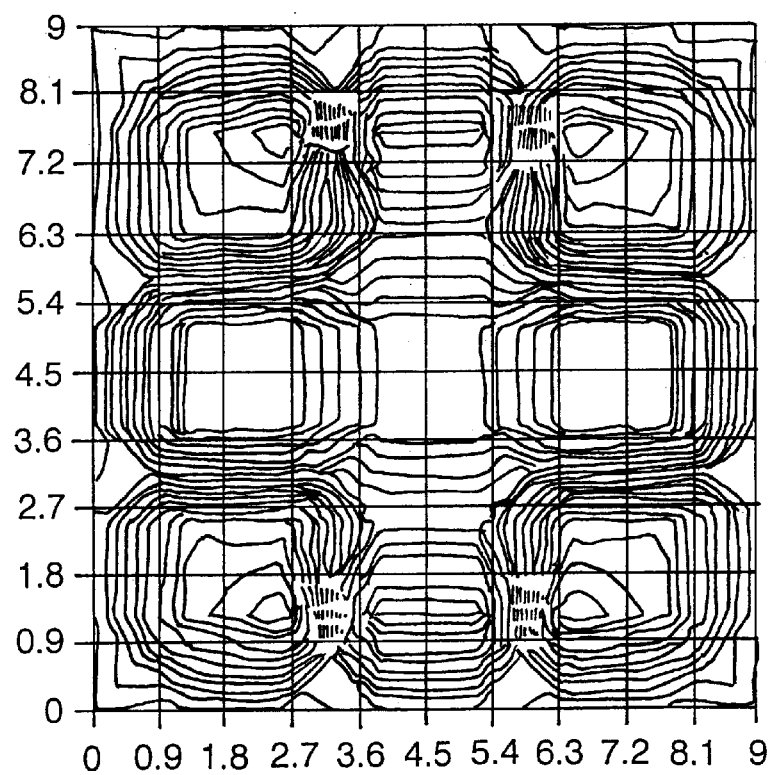
FIG. 13 is a chart showing the magnetic field distribution for the arrangement of FIG. 12.
Figure 14:
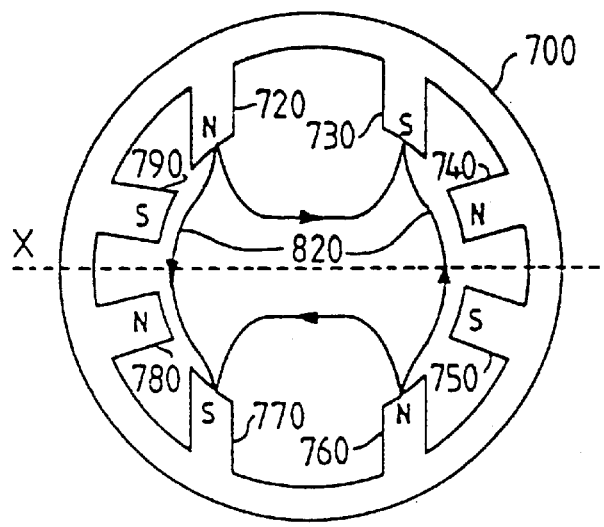
FIG. 14 is a plan view of the structure of FIG. 9 and the force lines corresponding to a magnetic field generated by all eight poles when energised differently in different directions; and, FIG. 15 is a chart showing the magnetic field distribution for the arrangement of FIG. 14.
Figure 15:
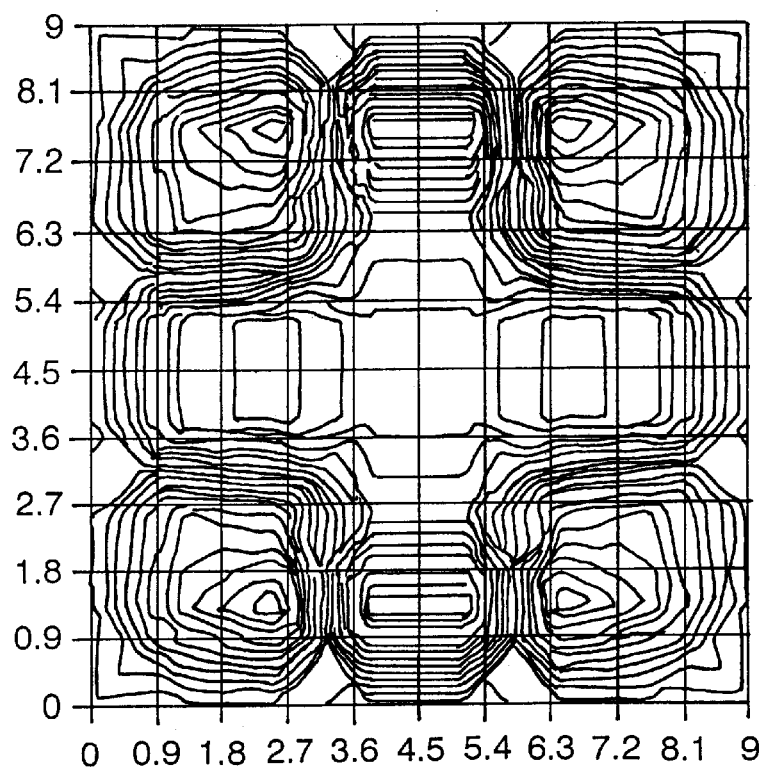

Referring now to FIG. 8, in a particularly preferred embodiment of the present invention, demodulator 400 has an astigmatism control system 580 arranged to create a magnetic field having lines of magnetic force 680 passing through all three electron beams 661 . 663 of an in-line beam CRT in the same direction, horizontally. The lines of force in the other direction, vertical, are diverted away from the area of electron beams 661–663. This produces the same vertical astigmatism in all three electron beam spots. Referring now to FIG. 9, to create the lines of magnetic force 680 in FIG. 8, astigmatism control system 580 of the particularly preferred embodiment of the present invention comprises a eight pole electro-magnet structure 700 formed from ferromagnetic material. In use, the structure is mounted around the neck (not shown in FIG. 9) of CRT 210 adjacent the electron gun assembly producing the three electron beams 661 . 663. Pole pieces 720–790 of structure 700 are substantially equally spaced around the circumference of the neck and directed radially inwardly towards the centre of the neck. A winding 710 wound onto each pole 720–790 of structure 700. Winding 710 passes around each pole in turn in alternate directions to provide, in operation, successive poles around neck 211 with opposite polarities N and S. In use, structure 700 is energised by a current I flowing in winding 710. Referring back briefly to FIG. 5, current I is generated by control voltage 570. When energised, structure 600 generates a magnetic field in neck 211. FIG. 10 shows, by way of illustration only, lines of force 800 corresponding to the magnetic field which would be produced if winding 710 passed around only upper and lower pole pieces 720, 730,760,770. FIG. 11 shows the magnetic field distribution corresponding to FIG. 10. The lines of force in FIG. 10 are similar to those shown in FIG. 7, with both horizontal lines and vertical lines 800 passing through the area of electron beams 661–663. However, referring to FIG. 12, as winding 710 passes around all eight pole pieces 720–790, when current I flows, the vertical lines of force 810 are drawn towards side pole pieces 740,750,780,790, away from the area of electron beams. FIG. 13 shows the magnetic field distribution corresponding to FIG. 12. In especially preferred embodiments of the present invention, there are more turns of winding 710 on side pole pieces 740,750,780,790 than on upper and lower pole pieces 720,730,760,770 to generate a greater magnetic field strength on the horizontal direction relative to the vertical direction thereby drawing the vertical force lines further away from the area of electron beams 661–663. FIG. 14 shows the lines of force corresponding to the magnetic field generated when side pole pieces 740,750,780,790 carry three times the number of turns than upper and lower pole pieces 720,730,760,770. Vertical lines of force 820 are drawn even further way from the area of electron beams 661–663. FIG. 15 shows the magnetic field distribution corresponding to the lines of force shown in FIG. 14.

It will be appreciated that the preferred embodiments of the present invention hereinbefore described with reference to FIGS. 8 to 15 of the accompanying drawings are applicable to both displays having a single electron beam CRT such as a monochrome CRT or a Trinitron CRT, and to displays having a CRT in which multiple electron beams are arranged in line.

In summary, preferred embodiments of the present invention have been hereinbefore described in which there is provided raster demodulation apparatus for a raster-scanned cathode ray tube display comprises control means 400 for varying the shape of at least one scanned electron beam spot 661–663 in a direction perpendicular to scan lines of the raster. The control means 400 comprises an electro-magnet 700 for mounting on the neck of the cathode ray tube. The magnet 700 has eight pole pieces 720–790 equally spaced around the neck of the cathode ray tube 210. A winding 710 passes around each of the pole pieces 720–790 in succession in opposite directions so that, when an electrical current I is passed through the winding, adjacent pole pieces 720–790 around the neck of the cathode ray tube have different magnetic polarity to generate, within the neck of the cathode ray tube 210, a magnetic field in which magnetic lines of force 680 pass through the or each electron beam 661–663 only in a direction parallel to the scan lines of the raster.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. Apparatus for the demodulation of a raster for a display having a cathode ray tube, the cathode ray tube having a neck and a raster, the raster having scan lines, the apparatus comprising control means for varying the shape of at least one scanned electron beam (661–663) in a direction perpendicular to scan lines of the raster; characterised in that the control means comprises an electro-magnet (700) for mounting on the neck of the cathode ray tube, the magnet (700) having a eight pole pieces (720–790) spaced around the neck of the cathode ray tube (210) and a winding (710) passing around each of the pole pieces (720–790) in succession in opposite directions, the pole pieces being divided into a first group of four pole pieces comprising two pairs of pole pieces facing each other in a direction parallel to the lines of the raster and a second group of four pole pieces comprising two pairs of pole pieces facing each other in a direction perpendicular to the lines of the raster, the first group each having a greater number of turns of the winding than the second group so that, when an electrical current (I) is passed through the winding, adjacent pole pieces (720–790) around the neck of the cathode ray tube have different magnetic polarity to generate, within the neck of the cathode ray tube (210), a magnetic field in which magnetic lines of force (680) pass through the at least one electron beam (661–663) only in a direction parallel to the scan lines of the raster.

2. Apparatus as claimed in claim 1, wherein the poles in the first group each carry three times the number of turns of the winding carried by each of the poles of the second group.

3. Apparatus as claimed in claim 1, wherein the pole pieces are directed radially inwardly.

4. Apparatus as claimed in claim 1, wherein the control means is arranged to vary the current passing through the winding in dependence on the line density of the raster of an image displayed on the display.

5. Apparatus as claimed in claim 4, wherein the control means comprises a detector for determining the line density of the raster in dependence on raster line and frame synchronisation signals corresponding to the image displayed on the display.

6. Apparatus as claimed in claim 5, wherein the display receives a line synchronization signal and a frame synchronization signal and wherein the detector comprises a switched capacitor low pass filter (540) having a clock input triggered by the line synchronization signal, a signal input responsive to the frame synchronization signal, and an output for varying the shape of the scanned electron beam.

7. Apparatus as claimed in claim 6 wherein the switched capacitor filter is configured as a second order low pass filter.

8. Apparatus as claimed in claim 6, wherein the detector comprises: first duty cycle means (500) for converting the line synchronisation signal to a line square wave signal; and second duty cycle means (520) for converting the frame synchronisation signal to a frame square wave signal.

9. Apparatus as claimed in claim 8, wherein the detector comprises an anti-aliasing filter (530) having an input connected to the output of the second duty cycle means and an output connected to the signal input of the switched capacitor filter.

10. Apparatus as claimed in claim 9, wherein the detector comprises a divide by N counter (510) having an input connected to the first duty cycle means and an output connected to the clock input of the switched capacitor filter.

11. Apparatus as claimed in claim 6, wherein the detector comprises a rectifier (550) for generating a DC voltage control level in response to the output of the filter.

12. A cathode ray tube display comprising a cathode ray tube and raster demodulation apparatus as claimed in claim 1.

* * * * *

UNITED STATES PATENT AND TRADEMARK OFFICE
CERTIFICATE OF CORRECTION

PATENT NO. : 6,268,705 B1
DATED : July 31, 2001
INVENTOR(S) : J. Beeteson et al.

It is certified that error appears in the above-identified patent and that said Letters Patent is hereby corrected as shown below:

<u>Column 9,</u>
Line 63, "661.663" should read -- 661-663 --

Signed and Sealed this

First Day of October, 2002

Attest:

Attesting Officer

JAMES E. ROGAN
Director of the United States Patent and Trademark Office